United States Patent
Yin et al.

(10) Patent No.: US 11,973,416 B1
(45) Date of Patent: Apr. 30, 2024

(54) ADAPTIVE LOAD-RESPONSIVE PORTABLE ELECTRIC ENERGY STORAGE SYSTEM AND POWER REGULATION METHOD THEREOF

(71) Applicant: ZHEJIANG LERA NEW ENERGY POWER TECHNOLOGY CO., LTD, Ningbo (CN)

(72) Inventors: Rongjiang Yin, Ningbo (CN); Huabin Hu, Ningbo (CN); Xijun Guo, Ningbo (CN); Qiang Deng, Ningbo (CN)

(73) Assignee: ZHEJIANG LERA NEW ENERGY POWER TECHNOLOGY CO., LTD, Ningbo (CN)

( * ) Notice: Subject to any disclaimer, the term of this patent is extended or adjusted under 35 U.S.C. 154(b) by 0 days.

(21) Appl. No.: 18/129,901

(22) Filed: Apr. 3, 2023

(30) Foreign Application Priority Data

Nov. 16, 2022 (CN) .......................... 202211429919.3

(51) Int. Cl.
| | | |
|---|---|---|
| *H02J 7/00* | (2006.01) | |
| *H01M 10/42* | (2006.01) | |
| *H02M 1/00* | (2006.01) | |
| *H02M 1/32* | (2007.01) | |
| *H02M 7/44* | (2006.01) | |

(52) U.S. Cl.
CPC ........... *H02M 1/32* (2013.01); *H01M 10/425* (2013.01); *H02J 7/0047* (2013.01); *H02J 7/0063* (2013.01); *H02J 7/00712* (2020.01); *H02M 1/0009* (2021.05); *H02M 7/44* (2013.01)

(58) Field of Classification Search
CPC ............................... H02J 7/00712; H02M 1/32

USPC .......................................................... 320/111
See application file for complete search history.

(56) References Cited

U.S. PATENT DOCUMENTS

| | | | |
|---|---|---|---|
| 2007/0019453 A1 | 1/2007 | Pierce | |
| 2013/0088900 A1* | 4/2013 | Park | H02J 3/32 |
| | | | 363/71 |
| 2016/0359405 A1* | 12/2016 | Li | H02M 1/32 |
| 2019/0103756 A1 | 4/2019 | Hasegawa | |

(Continued)

FOREIGN PATENT DOCUMENTS

| | | |
|---|---|---|
| CN | 102931825 A | 2/2013 |
| CN | 103036243 A | 4/2013 |
| CN | 110121820 A | 8/2019 |

(Continued)

*Primary Examiner* — Yalkew Fantu
(74) *Attorney, Agent, or Firm* — Bayramoglu Law Offices LLC

(57) ABSTRACT

A portable electric energy storage system and a power regulation method thereof are provided. The portable electric energy storage system includes a housing, and an inverter and an energy storage battery disposed in the housing, and further includes: a power detector configured to detect a present power Pt of a connected load; a first comparator configured to compare the present power Pt with a rated power Pe of the inverter; a first actuator configured to regulate an output power of the inverter to a first preset power P1 if the present power Pt is greater than the rated power Pe of the inverter; and a second actuator configured to gradually regulate the output power of the inverter to a second preset power P2 after the connected load is driven to start operation or operate for a period of time; or determine whether to stop driving output of the load.

14 Claims, 6 Drawing Sheets

(56) References Cited

U.S. PATENT DOCUMENTS

2021/0126464 A1* 4/2021 Konishi .................... H02J 3/32
2022/0038111 A1* 2/2022 Morgan ................ H02M 3/156

FOREIGN PATENT DOCUMENTS

| CN | 114123747 A | 3/2022 |
| CN | 114142752 A | 3/2022 |
| CN | 114389472 A | 4/2022 |
| CN | 114567045 A | 5/2022 |
| CN | 114678896 A | 6/2022 |
| CN | 115021301 A | 9/2022 |

* cited by examiner

ADAPTIVE LOAD-RESPONSIVE PORTABLE ELECTRIC ENERGY STORAGE SYSTEM AND POWER REGULATION METHOD THEREOF

CROSS REFERENCE TO THE RELATED APPLICATIONS

This application is based upon and claims priority to Chinese Patent Application No. 202211429919.3, filed on Nov. 16, 2022, the entire contents of which are incorporated herein by reference.

TECHNICAL FIELD

The present disclosure relates to the technical field of power supply, and in particular, to a portable electric energy storage system and a power regulation method thereof.

BACKGROUND

As types of outdoor activities increase, power supply of various types of electric devices becomes an urgent problem to be resolved in outdoor activities. Therefore, portable electric energy storage systems become a choice of a growing number of people.

An inverter is usually disposed in an existing portable electric energy storage system to output an alternating current (AC) to power an external AC load for operation. At present, a conventional inverter is often used to carry various AC loads (hereinafter referred to as loads) when the inverter is off-grid. Due to uncertainty of the carried loads, a load whose power exceeds a rated power of the inverter is often connected. In this case, the inverter usually directly starts overload protection to ensure that the inverter is not damaged. Consequently, the load cannot be used on the inverter.

SUMMARY

The present disclosure resolves a problem that a load whose power exceeds a rated power of an inverter cannot be used and instantaneous impact of the load on an inverter is excessively high because the inverter directly starts overload protection when the load is connected.

To resolve the foregoing problem, an embodiment of the present disclosure provides a portable electric energy storage system, including a housing, and an inverter and an energy storage battery disposed in the housing. The housing is provided with at least an AC interface. An output terminal of the energy storage battery is electrically connected to the AC interface through the inverter and is configured to output an AC to power an external load. The portable electric energy storage system further includes: a power detector configured to detect a present power Pt of a connected load; a first comparator configured to compare the present power Pt with a rated power Pe of the inverter; a first actuator configured to regulate an output power of the inverter to a first preset power P1 if the present power Pt is greater than the rated power Pe of the inverter, where P1<Pe; and a second actuator configured to gradually regulate the output power of the inverter to a second preset power P2 after the connected load is driven at the first preset power P1 to start operation or operate for a period of time, where P1<P2<Pe; or determine whether to stop driving output of the load.

In comparison with the prior art, technical effects that can be achieved in this embodiment are as follows: When an AC load is connected, the power detector can detect a power of the connected load, to obtain the present power Pt of the connected load. If the present power Pt exceeds the rated power Pe of the inverter, the inverter does not directly start overload protection. When the external load is overloaded, the first actuator reduces the output power of the inverter to the first preset power P1, to reduce instantaneous current impact of the load on the inverter and prevent the inverter from being damaged. The second actuator controls the output power of the inverter to be gradually increased to the second preset power P2 or controls whether to stop driving the output of the load, to gradually improve operating efficiency of the load and protect the inverter from damage. In this way, the portable electric energy storage system supplies power more safely and efficiently.

In an optional implementation, the portable electric energy storage system further includes a first timer configured to count a time T for which the inverter maintains operation at the second preset power P2. When T reaches a preset time T1, the output power of the inverter is regulated to the rated power Pe of the inverter. After the inverter maintains operation at the rated power Pe for a preset time T2, the present power Pt of the connected load is re-detected, where T2<T1.

It can be understood that the first timer is disposed to count a time for which the inverter maintains operation at a specific output power, to subsequently regulate the output power of the inverter such that power output of the inverter is more reasonable. This helps extend service lives of the inverter and the connected load while improving the operating efficiency of the load.

In an optional implementation, the portable electric energy storage system further includes a current detection circuit configured to detect a present current It of the load when the inverter operates at the first preset power P1; and a second comparator configured to compare the present current It of the load with a maximum current Im supported by the inverter. If It≤Im, the second actuator gradually regulates the output power of the inverter to the second preset power P2.

It can be understood that the current detection circuit and the second comparator are disposed to detect and compare the present current It of the load and the maximum current Im of the inverter such that the output power of the inverter is controlled to drive the load to normally operate. If It≤Im, an optimal output power for driving the load to operate is implemented by gradually regulating the output power of the inverter. This helps extend usage status and the service life of the load.

In an optional implementation, the portable electric energy storage system further includes a first voltage detection circuit configured to detect a present output voltage Uo1 of the inverter at the first preset power P1 if It≤Im; and a third comparator configured to compare the present output voltage Uo1 with a preset rated voltage Ur of the inverter. If Uo1<Ur, the second actuator gradually regulates the output power of the inverter to the second preset power P2.

It can be understood that if It≤Im, the first voltage detection circuit obtains the present output voltage Uo1, and the third comparator compares the present output voltage Uo1 with the preset rated voltage Ur of the inverter. If Uo1<Ur, the second actuator gradually regulates the output power of the inverter to the second preset power P2, to prevent the inverter from being damaged due to an instantaneous increase in the output power.

In an optional implementation, the portable electric energy storage system further includes a third actuator configured to reduce the present output voltage Uo1 if $Uo1 \geq Ur$. The first voltage detection circuit continues to detect the present output voltage Uo1 of the inverter. The third comparator continues to compare the present output voltage Uo1 with the preset rated voltage Ur of the inverter, to execute a corresponding control program based on a comparison result.

It can be understood that if the third comparator obtains that $Uo1 \geq Ur$ through comparison, the present output voltage Uo1 of the inverter is reduced until the present output voltage Uo1 of the inverter is less than the rated voltage Ur of the inverter, to prevent the inverter from being damaged because the present output voltage of the inverter is excessively high.

In an optional implementation, if It>Im, the second actuator controls the output power of the inverter to be a maximum power Pm, and a second voltage detection circuit and a fourth comparator are further disposed. The second voltage detection circuit is configured to detect a present output voltage Uo2 of the inverter at the maximum power Pm. The fourth comparator is configured to compare the present output voltage Uo2 with a preset minimum voltage Umin of the inverter. The second actuator determines, based on a comparison result between the present output voltage Uo2 and the minimum voltage Umin of the inverter, whether to stop driving the output of the load.

It can be understood that if It>Im, the output power of the inverter is controlled to be the maximum power Pm. This prevents the inverter from being damaged because the present current It of the load is excessively high, to protect hardware of the inverter from damage. This also avoids that the load cannot operate because the inverter directly starts overcurrent protection and stops power output if It>Im. In addition, the second voltage detection circuit is configured to obtain the present output voltage Uo2 of the inverter at the maximum power Pm. The fourth comparator compares the present output voltage Uo2 with the preset minimum voltage Umin of the inverter. It is determined based on the comparison result whether to stop driving the output of the load, to ensure that the load operates within a standard voltage range.

In an optional implementation, if Uo2<Umin, the inverter stops driving the output of the load; and/or if $Uo2 \geq Umin$, the power detector re-detects the present power Pt of the connected load, and the first comparator compares the present power Pt with the rated power Pe of the inverter, to execute a corresponding control program based on a comparison result.

It can be understood that if Uo2<Umin, the output voltage of the inverter is less than the minimum voltage Umin of the inverter, the load operates within a non-standard voltage range, and the present output voltage Uo2 of the inverter is abnormal. In this case, the output of the load stops being driven. On the contrary, the present power Pt of the connected load is re-detected, and the first comparator compares the present power Pt with the rated power Pe of the inverter, to execute the corresponding control program based on the comparison result. This implements cycle monitoring and prevents the inverter from being damaged due to excessive impact of the load on the inverter.

In an optional implementation, the portable electric energy storage system further includes a second timer configured to count an abnormality time Td for which Uo2<Umin; and a fifth comparator configured to compare the abnormality time Td with a preset voltage abnormality protection time Ts of the inverter. If $Td \geq Ts$, the second actuator controls the inverter to stop driving the output of the load; and/or if Td<Ts, the second voltage detection circuit continues to detect the present output voltage Uo2 of the inverter at the maximum power Pm, and the fourth comparator compares the present output voltage Uo2 with the preset minimum voltage Umin of the inverter, to execute a corresponding control program based on a comparison result.

It can be understood that the second timer is disposed to obtain the time Td for which the voltage is abnormal if Uo2<Umin, and the fifth comparator compares the time Td with the preset voltage abnormality protection time Ts of the inverter. If $Td \geq Ts$, the time for which the present output voltage Uo2 is abnormal is excessively long. In this case, the output of the load stops being driven, to prevent the inverter from outputting an abnormal voltage for a long time and protect the inverter from damage. On the contrary, the second voltage detection circuit continues to detect the present output voltage Uo2 of the inverter at the maximum power Pm, and the fourth comparator compares the present output voltage Uo2 with the preset minimum voltage Umin of the inverter, to execute the corresponding control program based on the comparison result.

An embodiment of the present disclosure further provides a power regulation method of a portable electric energy storage system, including:

step 1: obtaining a present power Pt of a connected load;

step 2: comparing the present power Pt with a rated power Pe of an inverter;

step 3: if Pt>Pe, regulating an output power of the inverter to a first preset power P1, where P1<Pe;

step 4: after the connected load is driven at the first preset power P1 to start operation, gradually regulating the output power of the inverter to a second preset power P2, where P1<P2<Pe; or determining whether to stop driving output of the load.

In comparison with the prior art, technical effects that can be achieved in this embodiment are as follows: When an AC load is connected, a power of the connected load can be detected, to obtain the present power Pt of the connected load. If the present power Pt exceeds the rated power Pe of the inverter, the inverter does not directly start overload protection. When the external load is overloaded, the output power of the inverter is reduced to the first preset power P1, to reduce instantaneous current impact of the load on the inverter and prevent the inverter from being damaged. The output power of the inverter is controlled to be gradually increased to the second preset power P2 or it is controlled whether to stop driving the output of the load, to gradually improve operating efficiency of the load and protect the inverter from damage.

In an optional implementation, the method further includes: step 5: operating at the second preset power P2 for a preset time T1, regulating the output power of the inverter to the rated power Pe of the inverter, and operating at the rated power Pe for a preset time T2, where T2<T1; and step 6: periodically repeating steps 1 to 5.

It can be understood that after the output power of the inverter is maintained for the preset time T1, the output power is regulated to the rated power Pe of the inverter. After the output power is maintained for the preset time T2, steps 1 to 5 are periodically repeated. Regulation of the output power of the inverter is more scientific and reasonable. System control fluctuation caused by frequent regulation of the output power of the inverter is avoided. This helps extend service lives of the inverter and the connected load while improving the operating efficiency of the load.

In an optional implementation, step 4 includes: step 4.1: obtaining a present current It of the load when the inverter operates at the first preset power P1; step 4.2: comparing the present current It of the load with a maximum current Im supported by the inverter; and step 4.3: if It≤Im, gradually regulating the output power of the inverter to the second preset power P2.

It can be understood that the present current It of the load and the maximum current Im of the inverter are obtained and compared such that the output power of the inverter is controlled to drive the load to normally operate. If It≤Im, an optimal output power for driving the load to operate is implemented by gradually regulating the output power of the inverter. This helps extend usage status and the service life of the load.

In an optional implementation, step 4.3 includes: step 4.3.1: if It≤Im, sequentially obtaining a present output voltage Uo1 of the inverter at the first preset power P1; step 4.3.2: comparing the present output voltage Uo1 with a preset rated voltage Ur of the inverter; step 4.3.3: if Uo1<Ur, gradually regulating the output power of the inverter to the second preset power P2; and/or if Uo1≥Ur, reducing the present output voltage Uo1 and repeating steps 4.3.1 and 4.3.2.

It can be understood that if It≤Im, the present output voltage Uo1 is obtained, and the present output voltage Uo1 is compared with the preset rated voltage Ur of the inverter. If Uo1<Ur, the output power of the inverter is gradually regulated to the second preset power P2, to prevent the inverter from being damaged due to an instantaneous increase in the output power.

In an optional implementation, step 4.3 further includes: if It>Im, controlling the output power of the inverter to be the maximum power Pm, and performing the following steps: step a: obtaining a present output voltage Uo2 of the inverter at the maximum power Pm; step b: comparing the present output voltage Uo2 with a preset minimum voltage Umin of the inverter; and step c: determining, based on a comparison result between the present output voltage Uo2 and the minimum voltage Umin of the inverter, whether to stop driving the output of the load. If Uo2<Umin, the inverter stops driving the output of the load; and/or if Uo2≥Umin, steps 1 to 4 are repeated.

It can be understood that if It>Im, the output power of the inverter is controlled to be the maximum power Pm. This prevents the inverter from being damaged because the present current It of the load is excessively high, to protect hardware of the inverter from damage. This also avoids that the load cannot operate because the inverter directly starts overcurrent protection and stops outputting a power if It>Im. In addition, the present output voltage Uo2 of the inverter at the maximum power Pm is obtained and compared with the preset minimum voltage Umin of the inverter. If Uo2<Umin, the output of the load stops being driven to ensure that the load operates within a standard voltage range. Otherwise, steps 1 to 4 are repeated. This implements cycle monitoring and prevents the inverter from being damaged due to excessive impact of the load on the inverter.

In an optional implementation, step c includes: step c.1: counting an abnormality time Td for which Uo2<Umin; step c.2: comparing the abnormality time Td with a preset voltage abnormality protection time Ts of the inverter; step c.3: if Td≥Ts, stopping, by the inverter, driving the output of the load; and/or if Td<Ts, repeating steps a to c.

It can be understood that the time Td for which the voltage is abnormal if Uo2<Umin is obtained, and the time Td is compared with the preset voltage abnormality protection time Ts of the inverter. If Td≥Ts, the time for which the present output voltage Uo2 is abnormal is excessively long. In this case, the output of the load stops being driven, to prevent the inverter from outputting an abnormal voltage for a long time and protect the inverter from damage. On the contrary, steps a to c are repeated.

An embodiment of the present disclosure further provides a portable electric energy storage system, which includes a readable storage medium storing a computer program and a packaged integrated circuit (IC) electrically connected to the readable storage medium. When the computer program is read and run by the packaged IC, the portable electric energy storage system implements the power regulation method according to any one of the foregoing implementations.

The present disclosure has the following advantages:

(1) When the AC load is connected, the power of the connected load can be detected, to obtain the present power Pt of the connected load. If the present power Pt exceeds the rated power Pe of the inverter, the inverter does not directly start overload protection. When the external load is overloaded, the output power of the inverter is reduced to the first preset power P1, to reduce instantaneous current impact of the load on the inverter and prevent the inverter from being damaged. The output power of the inverter is controlled to be gradually increased to the second preset power P2 or it is controlled whether to stop driving the output of the load, to gradually improve the operating efficiency of the load and protect the inverter from damage.

(2) The present current It of the load and the maximum current Im of the inverter are obtained and compared such that the output power of the inverter is controlled to drive the load to normally operate. If It≤Im, the optimal output power for driving the load to operate is implemented by gradually regulating the output power of the inverter. This helps extend the usage status and service life of the load.

(3) After the output power of the inverter is increased to the second preset power P2 and maintained for the preset time, the output power of the inverter is increased to the rated power Pe, This avoids system control fluctuation and impact on the service life of the load that occur because the output power of the inverter is frequently regulated when the load stably operates at the second preset power P2.

DETAILED DESCRIPTION OF THE EMBODIMENTS

To make the foregoing objectives, features, and advantages of the present disclosure clearer and more comprehensible, specific embodiments of the present disclosure will be described in detail below with reference to the accompanying drawings.

Embodiment 1

Figure 6:
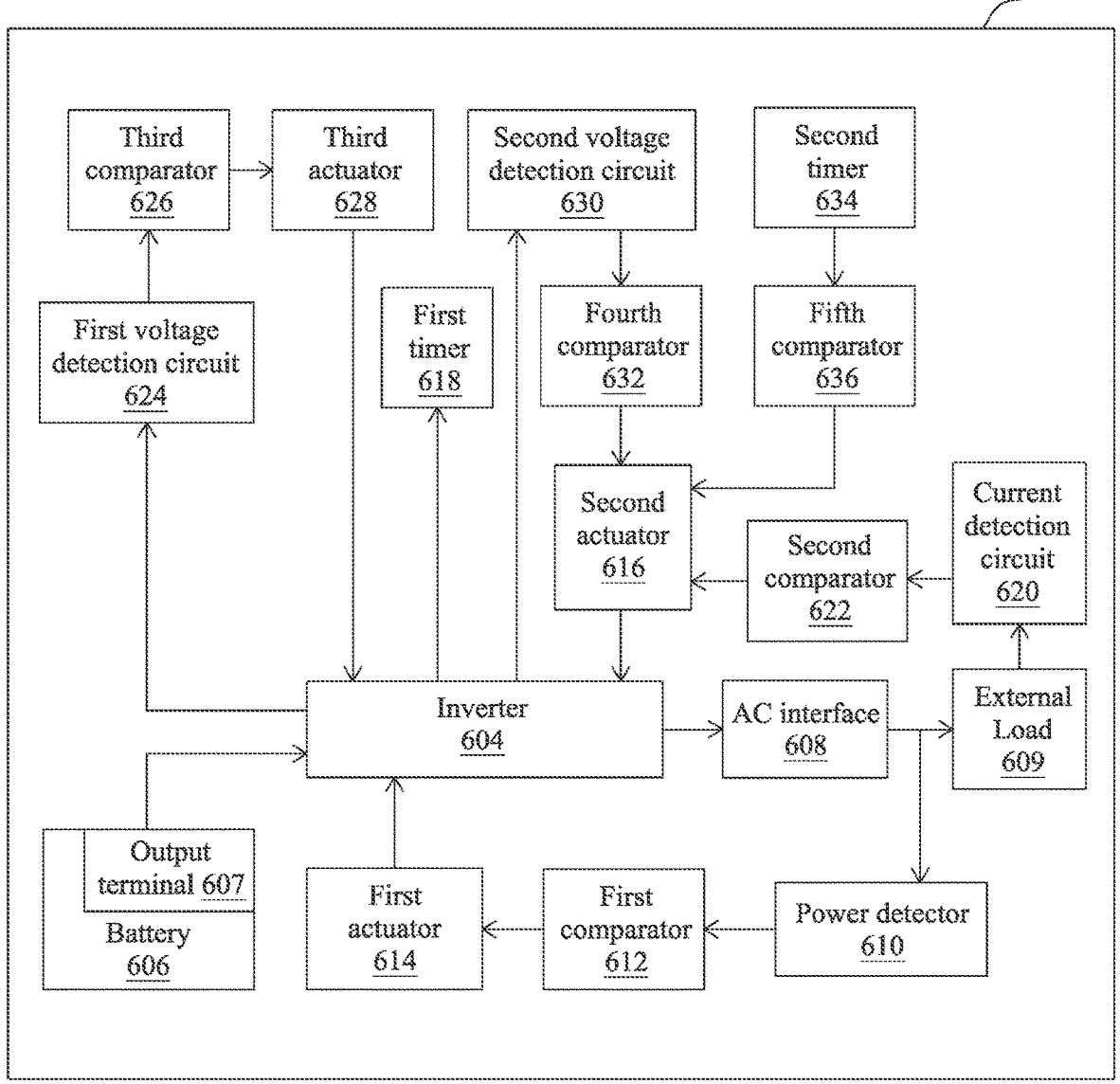
FIG. 6 is a schematic structural diagram of portable electric energy storage system 600.

This embodiment of the present disclosure provides a portable electric energy storage system 600, as illustrated in FIG. 6, including a housing 602, and an inverter 604 and an energy storage battery 606 disposed in the housing. The housing is provided with at least an AC interface 608. An output terminal 607 of the energy storage battery is electrically connected to the AC interface through the inverter and is configured to output an AC to power an external load 609. The portable electric energy storage system further includes: a power detector 610 configured to detect a present power Pt of a connected load; a first comparator 612 configured to compare the present power Pt with a rated power Pe of the inverter; a first actuator 614 configured to regulate an output power of the inverter to a first preset power P1 if the present power Pt is greater than the rated power Pe of the inverter, where P1<Pe; a second actuator 616 configured to gradually regulate the output power of the inverter to a second preset power P2 after the connected load is driven at the first preset power P1 to start operation or operate for a period of time, where P1<P2<Pe; or determine whether to stop driving output of the load.

When an AC load is connected, the power detector can detect a power of the connected load, to obtain the present power Pt of the connected load. If the present power Pt exceeds the rated power Pe of the inverter, the inverter does not directly start overload protection. When the external load is overloaded, the first actuator reduces the output power of the inverter to the first preset power P1, to reduce instantaneous current impact of the load on the inverter and prevent the inverter from being damaged. The second actuator controls the output power of the inverter to be gradually increased to the second preset power P2 or controls whether to stop driving the output of the load, to gradually improve operating efficiency of the load and protect the inverter from damage.

The portable electric energy storage system further includes a first timer 618 configured to count a time T for which the inverter maintains operation at the second preset power P2. When T reaches a preset time T1, the output power of the inverter is regulated to the rated power Pe of the inverter. After the inverter maintains operation at the rated power Pe for a preset time T2, the present power Pt of the connected load is re-detected, where T2<T1.

The first timer is disposed to count a time for which the inverter maintains operation at a specific output power, to subsequently regulate the output power of the inverter such that power output of the inverter is more reasonable. This helps extend service lives of the inverter and the connected load while improving the operating efficiency of the load.

The portable electric energy storage system further includes a current detection circuit 620 configured to detect a present current It of the load when the inverter operates at the first preset power P1; and a second comparator 622 configured to compare the present current It of the load with a maximum current Im supported by the inverter. If It≤Im, the second actuator gradually regulates the output power of the inverter to the second preset power P2.

The current detection circuit and the second comparator are disposed to detect and compare the present current It of the load and the maximum current Im of the inverter such that the output power of the inverter is controlled to drive the load to normally operate. If It≤Im, an optimal output power for driving the load to operate is implemented by gradually regulating the output power of the inverter. This helps extend usage status and the service life of the load.

The portable electric energy storage system further includes a first voltage detection circuit 624 configured to detect a present output voltage Uo1 of the inverter at the first preset power P1 if It≤Im; and a third comparator 626 configured to compare the present output voltage Uo1 with a preset rated voltage Ur of the inverter. If Uo1<Ur, the second actuator gradually regulates the output power of the inverter to the second preset power P2.

If It≤Im, the first voltage detection circuit obtains the present output voltage Uo1, and the third comparator compares the present output voltage Uo1 with the preset rated voltage Ur of the inverter. If Uo1<Ur, the second actuator gradually regulates the output power of the inverter to the second preset power P2, to prevent the inverter from being damaged due to an instantaneous increase in the output power.

The portable electric energy storage system further includes a third actuator 628 configured to regulate the present output voltage Uo1 if Uo1≥Ur. The first voltage detection circuit continues to detect the present output voltage Uo1 of the inverter. The third comparator continues to compare the present output voltage Uo1 with the preset rated voltage Ur of the inverter, to execute a corresponding control program based on a comparison result.

If the third comparator obtains that Uo1≥Ur through comparison, the present output voltage Uo1 of the inverter is reduced until the present output voltage Uo1 of the inverter is less than the rated voltage Ur of the inverter, to prevent the inverter from being damaged due to an excessively high present output voltage of the inverter.

Further, if It>Im, the second actuator controls the output power of the inverter to be a maximum power Pm, and a second voltage detection circuit 630 and a fourth comparator 632 are further disposed. The second voltage detection circuit is configured to detect a present output voltage Uo2 of the inverter at the maximum power Pm. The fourth comparator is configured to compare the present output voltage Uo2 with a preset minimum voltage Umin of the inverter. The second actuator determines, based on a comparison result between the present output voltage Uo2 and the minimum voltage Umin of the inverter, whether to stop driving the output of the load.

If It>Im, the output power of the inverter is controlled to be the maximum power Pm. This prevents the inverter from being damaged because the present current It of the load is excessively high, to protect hardware of the inverter from damage. This also avoids that the load cannot operate because the inverter directly starts overcurrent protection and stops outputting a power if It>Im. In addition, the second voltage detection circuit is configured to obtain the present output voltage Uo2 of the inverter at the maximum power Pm. The fourth comparator compares the present output voltage Uo2 with the preset minimum voltage Umin of the inverter. It is determined based on the comparison result whether to stop driving the output of the load, to ensure that the load operates within a standard voltage range.

Further, if Uo2<Umin, the inverter stops driving the output of the load; and/or if Uo2≥Umin, the power detector re-detects the present power Pt of the connected load, and the first comparator compares the present power Pt with the rated power Pe of the inverter, to execute a corresponding control program based on a comparison result.

If Uo2<Umin, the output voltage of the inverter is less than the minimum voltage Umin of the inverter, the load operates within a non-standard voltage range, and the present output voltage Uo2 of the inverter is abnormal. In this case, the output of the load stops being driven. On the contrary, the present power Pt of the connected load is re-detected, and the first comparator compares the present power Pt with the rated power Pe of the inverter, to execute the corresponding control program based on the comparison result. This implements cyclic monitoring and prevents the inverter from being damaged due to excessive impact of the load on the inverter.

The portable electric energy storage system further includes a second timer 634 configured to count an abnormality time Td for which Uo2<Umin; and a fifth comparator 636 configured to compare the abnormality time Td with a preset voltage abnormality protection time Ts of the inverter. If Td≥Ts, the second actuator controls the inverter to stop driving the output of the load; and/or if Td<Ts, the second voltage detection circuit continues to detect the present output voltage Uo2 of the inverter at the maximum power Pm, and the fourth comparator compares the present output voltage Uo2 with the preset minimum voltage Umin of the inverter, to execute a corresponding control program based on a comparison result.

The second timer is disposed to obtain the time Td for which the voltage is abnormal if Uo2<Umin, and the fifth comparator compares the time Td with the preset voltage abnormality protection time Ts of the inverter. If Td≥Ts, the time for which the present output voltage Uo2 is abnormal is excessively long. In this case, the output of the load stops being driven, to prevent the inverter from outputting an abnormal voltage for a long time and protect the inverter from damage. On the contrary, the second voltage detection circuit continues to detect the present output voltage Uo2 of the inverter at the maximum power Pm, and the fourth comparator compares the present output voltage Uo2 with the preset minimum voltage Umin of the inverter, to execute the corresponding control program based on the comparison result.

Embodiment 2

Figure 1:
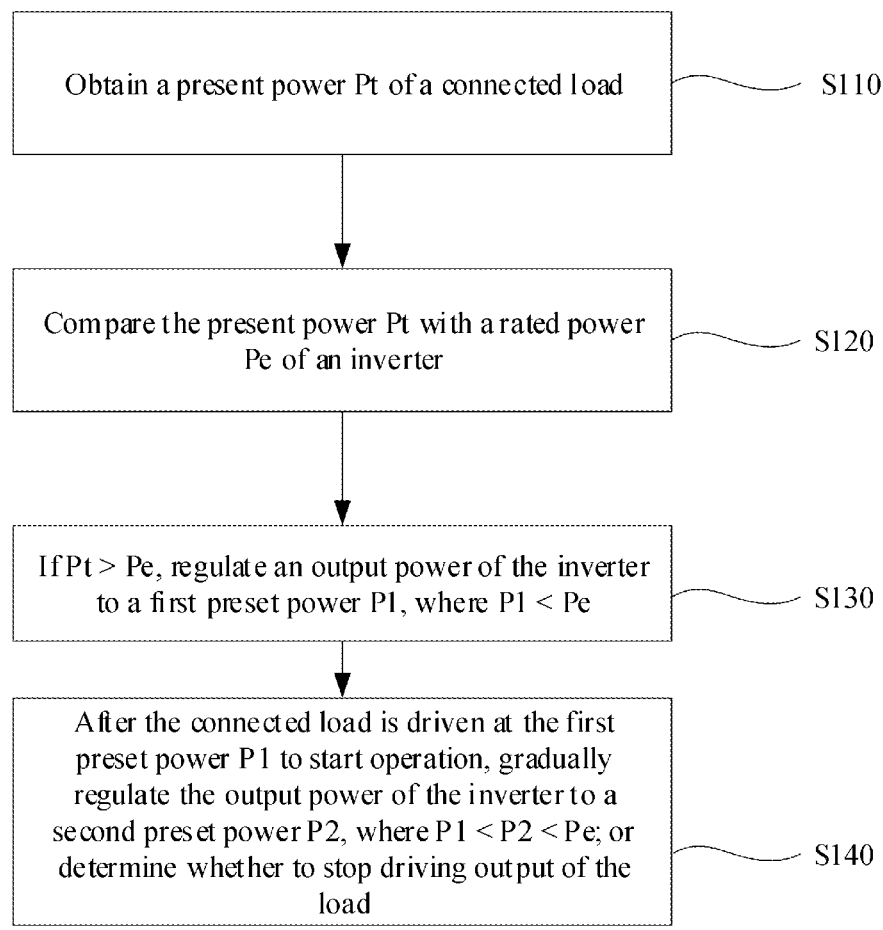
FIG. 1 is a control flowchart of a power regulation method according to Embodiment 2 of the present disclosure.

Referring to FIG. 1, an embodiment of the present disclosure provides a power regulation method of a portable electric energy storage system, including the following steps:

In S110, a present power Pt of a connected load is obtained.

It can be understood that when an external load is connected, a power detector in the portable electric energy storage system may obtain information about the connected load in real time through a communication terminal, for example, including an input power range of the load.

It should be noted that each load has an input power range. The load can be driven to operate within the input power range. The present power Pt of the connected load is a sum of a maximum value of the input power range of each connected load.

In S120, the present power Pt is compared with a rated power Pe of an inverter.

It can be understood that an output power of the inverter is regulated by comparing the present power Pt of the connected load with the rated power Pe of the inverter, to avoid that the load cannot be used on the inverter because the inverter directly starts overload protection when overload occurs.

In S130, if Pt>Pe, the output power of the inverter is regulated to a first preset power P1, where P1<Pe.

It should be noted that if the present power Pt of the load is greater than the rated power Pe of the inverter, overload occurs, and the output power of the inverter is reduced to the first preset power P1, to reduce instantaneous impact on the inverter when the load is overloaded.

In S140, after the connected load is driven at the first preset power P1 to start operation, the output power of the inverter is gradually regulated to a second preset power P2, where P1<P2<Pe; or it is determined whether to stop driving output of the load.

When an AC load is connected, a power of the connected load can be detected, to obtain the present power Pt of the connected load. If the present power Pt exceeds the rated power Pe of the inverter, the inverter does not directly start overload protection. When the external load is overloaded, the output power of the inverter is reduced to the first preset power P1, to reduce instantaneous current impact of the load on the inverter and prevent the inverter from being damaged. The output power of the inverter is controlled to be gradually increased to the second preset power P2 or it is controlled whether to stop driving the output of the load, to gradually improve operating efficiency of the load and protect the inverter from damage.

The foregoing output power regulation method is clearly illustrated in detail with reference to a use scenario provided below.

Inverter:

The rated power Pe is 600 W. The maximum power Pm is 1200 W.

The first preset power P1 is 417 W. The second preset power P2 is 570 W.

The maximum current Im is 5.4 A.

The rated voltage Ur is 220 V. The minimum voltage Umin is 209 V. The voltage abnormality protection time Ts is 30 s.

Connected Load:

The present power Pt is 1000 W.

Figure 2:
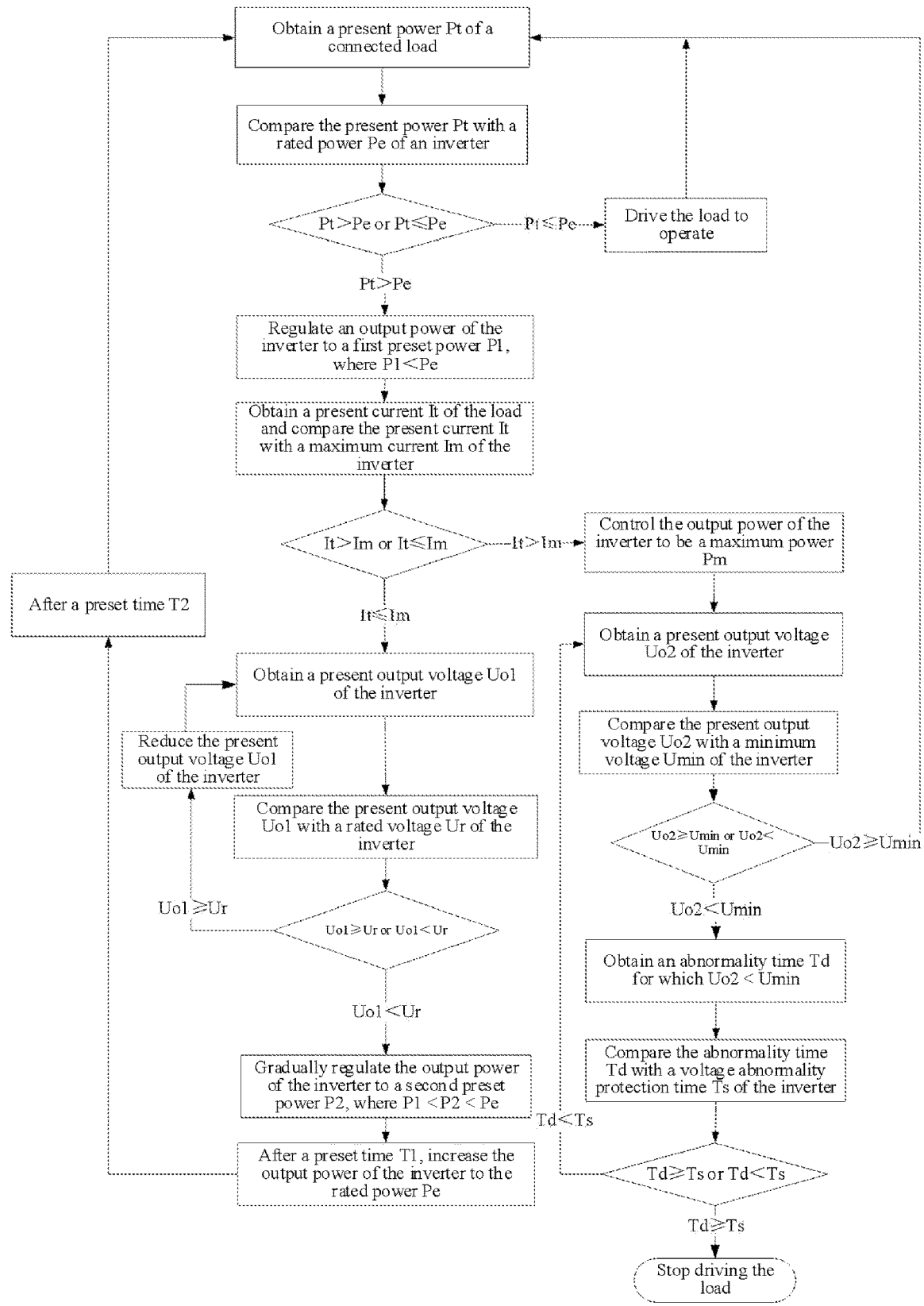
FIG. 2 is a detailed flowchart of a power regulation method according to Embodiment 2 of the present disclosure.
Figure 3:
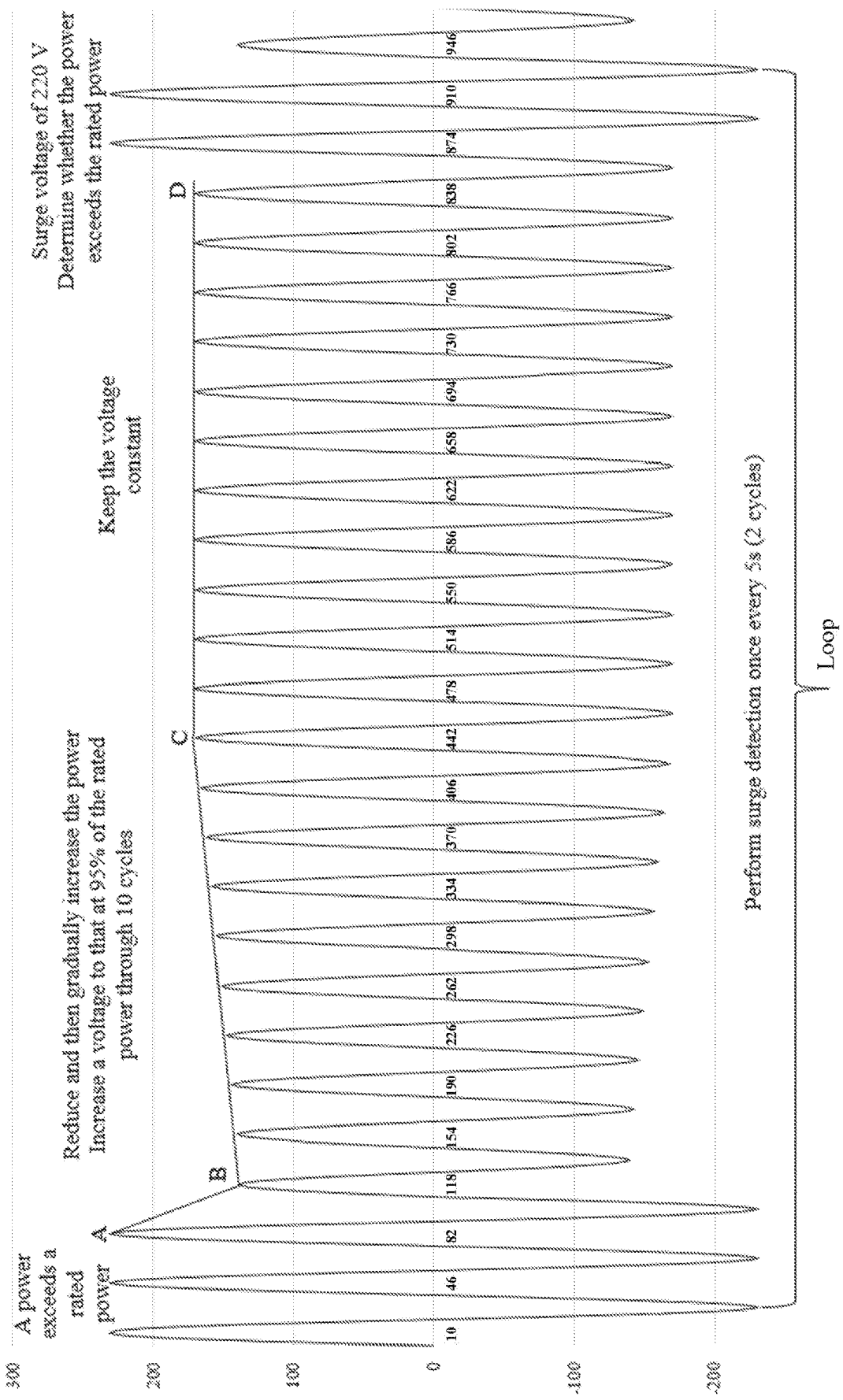
FIG. 3 is a schematic diagram of a voltage change during power regulation in a power regulation method according to Embodiment 2 of the present disclosure.

Referring to FIG. 2, at this time, the obtained present power Pt (1000 W) of the connected load is greater than Pe (600 W), the output power of the inverter is regulated to the first preset power P1 (417 W), that is, reduced from point A to point B in FIG. 3.

At the first preset power P1 (417 W), it is assumed that the present current It of the load is 3 A, which is less than Im (5.4 A).

The obtained present output voltage Uo1 (139 V) of the inverter at the first preset power P1 (417 W) is less than Ur (220 V). At this time, the output power of the inverter is gradually regulated to the second preset power P2 (570 W), that is, from point B to point C in FIG. 3. After the output power of the inverter is maintained at P2 (570 W) for the preset time T1, for example, 1 min, that is, maintained from point C to point D in FIG. 3, the output power of the inverter is increased to the rated power Pe (600 W).

After the preset time T2, for example, 30 s, the present power Pt of the load and the rated power Pe of the inverter are re-obtained. It is redetermined whether the present power Pt of the connected load exceeds the rated power Pe of the inverter.

Alternatively, at the first preset power P1 (417 W), it is assumed that the present current It of the load is 1.5 A, which is less than Im (5.4 A).

The obtained present output voltage Uo1 (278 V) of the inverter at the first preset power P1 (417 W) is greater than Ur (220 V). At this time, the present output voltage Uo1 of the inverter is reduced and re-compared with the rated voltage Ur of the inverter until Uo1<Ur. Then, the output power of the inverter is gradually increased to the second preset power P2 (570 W). After the output power of the inverted is maintained at P2 (570 W) for the preset time T1, for example, 1 min, the output power of the inverter is increased to the rated power Pe (600 W).

After the preset time T2, for example, 30 s, the present power Pt of the load and the rated power Pe of the inverter are re-obtained. It is redetermined whether the present power Pt of the connected load exceeds the rated power Pe of the inverter.

Alternatively,
at the first preset power P1 (417 W), it is assumed that the present current It of the load is 6 A, which is greater than Im (5.4 A).

The output power is the maximum power Pm (1200 W). At this time, the present output voltage Uo2 (200 V) is less than Umin (209 V). In other words, the present output voltage Uo2 of the inverter is abnormal. If the obtained time Td for which the present output voltage Uo2 is abnormal is 40 s, which is greater than Ts (30s), the load stops being driven. If the obtained time Td for which the present output voltage Uo2 is abnormal is 20 s, which is less than Ts (30s), the present output voltage Uo2 of the inverter is re-obtained and compared with the minimum voltage Umin (209 V) of the inverter.

Alternatively,
at the first preset power P1 (417 W), it is assumed that the present current It of the load is 5.6 A, which is greater than Im (5.4 A).

The output power is the maximum power Pm (1200 W). At this time, the present output voltage Uo2 is 214 V, which is greater than Umin (209 V). The present output voltage Uo2 of the inverter is normal. The present power Pt of the connected load is re-obtained and compared with the rated power Pe of the inverter.

If the obtained present power Pt of the connected load is 500 W, which is less than Pe, the load is driven to operate. After a preset time, the present power Pt of the connected load is re-obtained and compared with the rated power Pe of the inverter.

The present disclosure has the following advantages:
1. When the rated power of the inverter is less than the present power Pt of the connected load, the load can still be driven to operate at a low power. In addition, the output power of the inverter can be gradually increased to a power that matches the load such that the load operates at an appropriate low power.
2. When the present power Pt of the connected load is not greater than the rated power Pe of the inverter or slightly greater than the rated power Pe of the inverter, damage to the inverter due to an excessively high present current of the load is also effectively avoided.
3. The output power of the inverter is gradually and slowly increased to the second preset power such that the output power of the inverter can match the load, to improve operating efficiency of the load.

Embodiment 3

Figure 4:
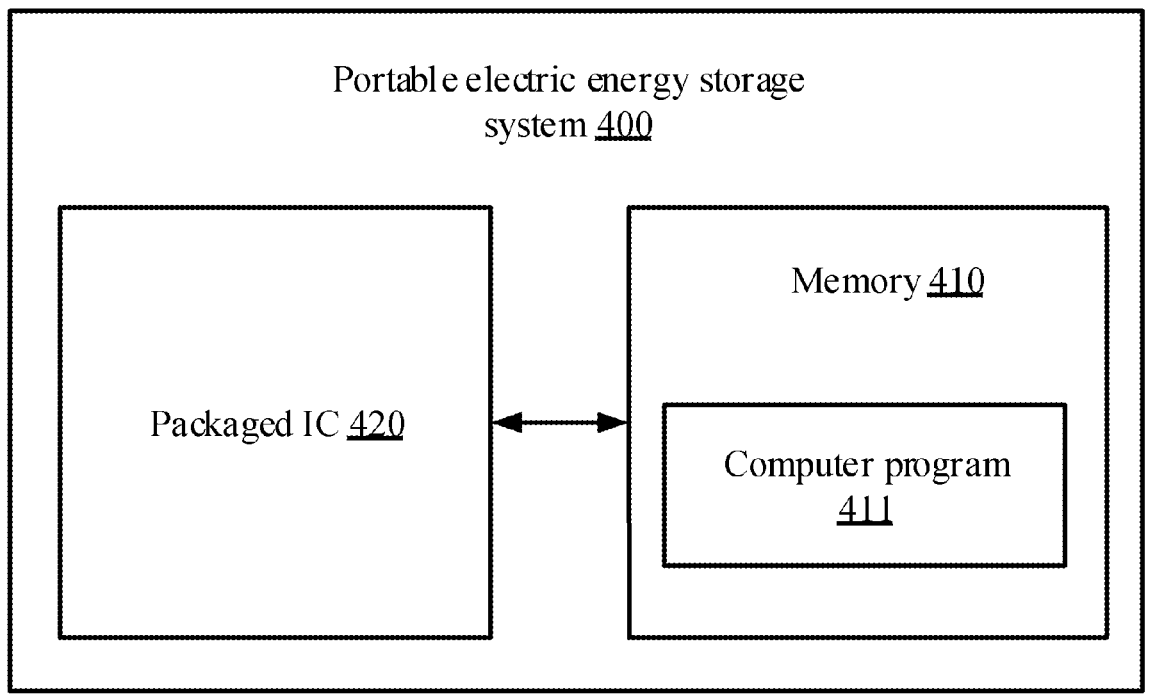
FIG. 4 is a schematic block diagram of portable electric energy storage system 400 according to Embodiment 3 of the present disclosure.

Referring to FIG. 4, the present disclosure further provides portable electric energy storage system 400, which includes memory 410 storing computer program 411 and packaged IC 420 electrically connected to the memory. When the packaged IC 420 reads and runs the computer program 411, the portable electric energy storage system 400 implements the output power regulation method in Embodiment 2. In a specific embodiment, the packaged IC 420 is, for example, a processor chip electrically connected to the memory 410 to read and run the compute program. The packaged IC 420 may alternatively be a packaged circuit board. A processor chip that can read and run the computer program 411 is packaged in the packaged circuit board. Certainly, the memory 410 may further be packaged in the circuit board.

The processor chip may further be provided with power regulation apparatus 300. The processor chip may implement the power regulation method in Embodiment 2 through the power regulation apparatus 300. Details are not described herein again.

Embodiment 4

Figure 5:
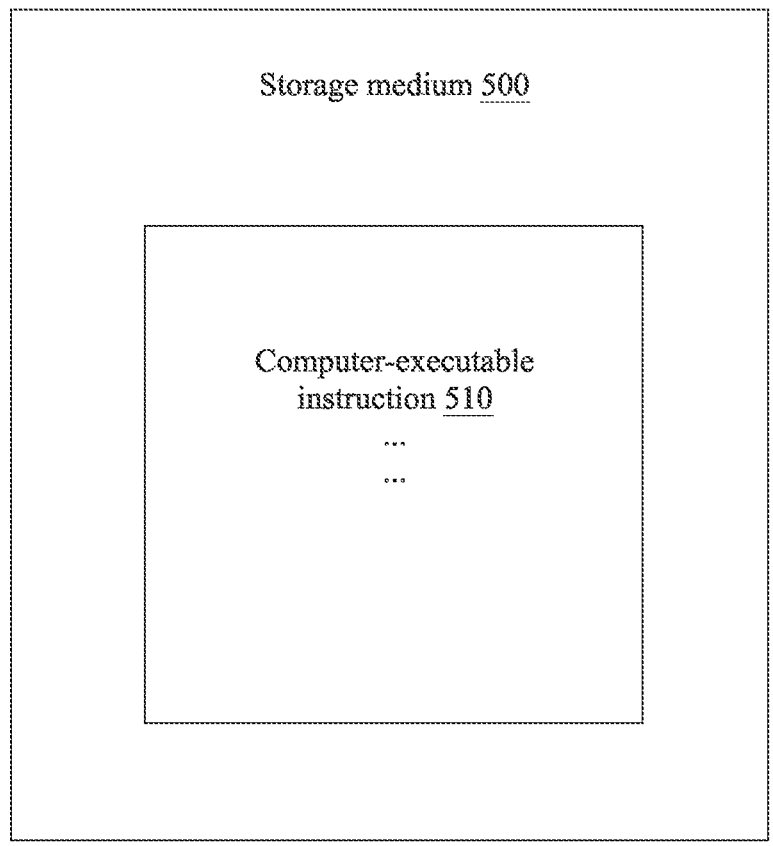
FIG. 5 is a schematic structural diagram of storage medium 500 according to Embodiment 4 of the present disclosure.

Referring to FIG. 5, an embodiment of the present disclosure further provides storage medium 500. The storage medium 500 stores computer-executable instruction 510. The computer-executable instruction 510, when read and run by a processor, controls a device in which the storage medium 500 is disposed to implement the power regulation method in Embodiment 2.

In several embodiments provided in the present application, it should be understood that the disclosed apparatus and method may be implemented in other manners. The apparatus embodiments described above are merely examples For example, all functional modules in the embodiments of the present disclosure may be integrated into one independent part, each of the modules may exist alone, or two or more modules may be integrated into one independent part.

The functions, if implemented in the form of a software functional module and sold or used as a stand-alone product, may be stored in a computer-readable storage medium. Based on such understanding, the technical solution of the present disclosure which is essential or a part contributing to the prior art or a part of the technical solution may be embodied in the form of a software product, the computer software product is stored in a storage medium and includes a plurality of instructions for causing a computer device (which may be a personal computer, a server, or a network device) to execute all or some steps of the method according to each embodiment of the present disclosure. The foregoing storage medium includes a USB flash disk, a mobile hard disk, a read-only memory (ROM), a random access memory (RAM), a magnetic disk, an optical disk, or the like, which can store program code.

Although being disclosed as described above, the present disclosure is not limited to this. Those skilled in the art may make various changes and modifications without departing from the spirit and scope of the present disclosure. Therefore, the protection scope of the present disclosure shall be subject to the scope defined by the claims.

What is claimed is:
1. A portable electric energy storage system, comprising a housing, and an inverter and an energy storage battery disposed in the housing, wherein the housing is provided with at least an alternating current (AC) interface, an output terminal of the energy storage battery is electrically connected to the AC interface through the inverter and is configured to output an AC to power an external load, and the portable electric energy storage system further comprises:
a power detector configured to detect a present power Pt of a connected load;

a first comparator configured to compare the present power Pt with a rated power Pe of the inverter;

a first actuator configured to regulate an output power of the inverter to a first preset power P1 if the present power Pt is greater than the rated power Pe of the inverter, wherein P1<Pe;

a second actuator configured to gradually regulate the output power of the inverter to a second preset power P2 after the connected load is driven at the first preset power P1 to start operation or operate for a period of time, wherein P1<P2<Pe; or determine whether to stop driving an output of the load;

a first timer configured to count a time T for which the inverter maintains operation at the second preset power P2, wherein when T reaches a preset time T1, the output power of the inverter is regulated to the rated power Pe of the inverter, and after the inverter maintains operation at the rated power Pe for a preset time T2, the present power Pt of the connected load is re-detected, wherein T2<T1;

a current detection circuit configured to detect a present current It of the load when the inverter operates at the first preset power P1; and a second comparator configured to compare the present current It of the load with a maximum current Im supported by the inverter; wherein if It≤Im, the second actuator gradually regulates the output power of the inverter to the second preset power P2.

2. The portable electric energy storage system according to claim 1, further comprising:

a first voltage detection circuit configured to detect a present output voltage Uo1 of the inverter at the first preset power P1 if It≤Im; and a third comparator configured to compare the present output voltage Uo1 with a preset rated voltage Ur of the inverter; wherein if Uo1<Ur, the second actuator gradually regulates the output power of the inverter to the second preset power P2.

3. The portable electric energy storage system according to claim 2, further comprising:

a third actuator configured to regulate the present output voltage Uo1 if Uo1≥Ur; wherein the first voltage detection circuit continues to detect the present output voltage Uo1 of the inverter, and the third comparator continues to compare the present output voltage Uo1 with the preset rated voltage Ur of the inverter, to execute a corresponding control program based on a comparison result.

4. The portable electric energy storage system according to claim 1, wherein if It>Im, the second actuator controls the output power of the inverter to be a maximum power Pm, and a second voltage detection circuit and a fourth comparator are further disposed;

the second voltage detection circuit is configured to detect a present output voltage Uo2 of the inverter at the maximum power Pm;

the fourth comparator is configured to compare the present output voltage Uo2 with a preset minimum voltage Umin of the inverter; and the second actuator determines, based on a comparison result between the present output voltage Uo2 and the minimum voltage Umin of the inverter, whether to stop driving the output of the load.

5. The portable electric energy storage system according to claim 4, wherein if Uo2<Umin, the inverter stops driving the output of the load; and/or if Uo2≥Umin, the power detector re-detects the present power Pt of the connected load, and the first comparator compares the present power Pt with the rated power Pe of the inverter, to execute a corresponding control program based on a comparison result.

6. The portable electric energy storage system according to claim 5, further comprising:

a second timer configured to count an abnormality time Td for which Uo2<Umin; and a fifth comparator configured to compare the abnormality time Td with a preset voltage abnormality protection time Ts of the inverter; wherein if Td≥Ts, the second actuator controls the inverter to stop driving the output of the load; and/or if Td<Ts, the second voltage detection circuit continues to detect the present output voltage Uo2 of the inverter at the maximum power Pm, and the fourth comparator compares the present output voltage Uo2 with the preset minimum voltage Umin of the inverter, to execute a corresponding control program based on a comparison result.

7. A power regulation method of a portable electric energy storage system, wherein the portable electric energy storage system comprises a housing, and an inverter and an energy storage battery disposed in the housing, the housing is provided with at least an alternating current (AC) interface, an output terminal of the energy storage battery is electrically connected to the AC interface through the inverter and is configured to output an AC to power an external load, and the power regulation method comprises:

step 1: obtaining a present power Pt of a connected load;

step 2: comparing the present power Pt with a rated power Pe of the inverter;

step 3: if Pt>Pe, regulating an output power of the inverter to a first preset power P1, wherein P1<Pe;

step 4: after the connected load is driven at the first preset power P1 to start operation, gradually regulating the output power of the inverter to a second preset power P2, wherein P1<P2<Pe; or determining whether to stop driving an output of the load;

step 5: operating at the second preset power P2 for a preset time T1, regulating the output power of the inverter to the rated power Pe of the inverter, and operating at the rated power Pe for a preset time T2, wherein T2<T1; and step 6: periodically repeating steps 1 to 5;

wherein step 4 comprises:

step 4.1: obtaining a present current It of the load when the inverter operates at the first preset power P1;

step 4.2: comparing the present current It of the load with a maximum current Im supported by the inverter; and step 4.3: if It≤Im, gradually regulating the output power of the inverter to the second preset power P2.

8. The power regulation method according to claim 7, wherein step 4.3 comprises:

step 4.3.1: if It≤Im, sequentially obtaining a present output voltage Uo1 of the inverter at the first preset power P1;

step 4.3.2: comparing the present output voltage Uo1 with a preset rated voltage Ur of the inverter;

step 4.3.3: if Uo1<Ur, gradually regulating the output power of the inverter to the second preset power P2; and/or if $Uo1 \geq Ur$, reducing the present output voltage $Uo1$ and repeating steps 4.3.1 and 4.3.2.

9. The power regulation method according to claim 7, wherein step 4.3 further comprises:

if $It > Im$, controlling the output power of the inverter to be a maximum power $Pm$, and performing the following steps:

step a: obtaining a present output voltage $Uo2$ of the inverter at the maximum power $Pm$;

step b: comparing the present output voltage $Uo2$ with a preset minimum voltage $Umin$ of the inverter; and step c: determining, based on a comparison result between the present output voltage $Uo2$ and the minimum voltage $Umin$ of the inverter, whether to stop driving the output of the load; wherein if $Uo2 < Umin$, the inverter stops driving the output of the load; and/or if $Uo2 \geq Umin$, steps 1 to 4 are repeated.

10. The power regulation method according to claim 9, wherein step c further comprises:

step c.1: counting an abnormality time $Td$ for which $Uo2 < Umin$;

step c.2: comparing the abnormality time $Td$ with a preset voltage abnormality protection time $Ts$ of the inverter;

step c.3: if $Td \geq Ts$, stopping, by the inverter, driving the output of the load; and/or if $Td < Ts$, repeating steps a to c.

11. A portable electric energy storage system comprising a storage medium storing a computer program and a packaged integrated circuit (IC) electrically connected to the storage medium, wherein the computer program, when executed by the packaged IC, causes the packaged IC to perform the power regulation method according to claim 9.

12. The portable electric energy storage system according to claim 11, wherein in the power regulation method, step 4.3 comprises:

step 4.3.1: if $It \leq Im$, sequentially obtaining a present output voltage $Uo1$ of the inverter at the first preset power $P1$;

step 4.3.2: comparing the present output voltage $Uo1$ with a preset rated voltage $Ur$ of the inverter;

step 4.3.3: if $Uo1 < Ur$, gradually regulating the output power of the inverter to the second preset power $P2$; and/or if $Uo1 \geq Ur$, reducing the present output voltage $Uo1$ and repeating steps 4.3.1 and 4.3.2.

13. The portable electric energy storage system according to claim 11, wherein in the power regulation method, step 4.3 further comprises:

if $It > Im$, controlling the output power of the inverter to be a maximum power $Pm$, and performing the following steps:

step a: obtaining a present output voltage $Uo2$ of the inverter at the maximum power $Pm$;

step b: comparing the present output voltage $Uo2$ with a preset minimum voltage $Umin$ of the inverter; and step c: determining, based on a comparison result between the present output voltage $Uo2$ and the minimum voltage $Umin$ of the inverter, whether to stop driving the output of the load; wherein if $Uo2 < Umin$, the inverter stops driving the output of the load; and/or if $Uo2 \geq Umin$, steps 1 to 4 are repeated.

14. The portable electric energy storage system according to claim 13, wherein in the power regulation method, step c further comprises:

step c.1: counting an abnormality time $Td$ for which $Uo2 < Umin$;

step c.2: comparing the abnormality time $Td$ with a preset voltage abnormality protection time $Ts$ of the inverter;

step c.3: if $Td \geq Ts$, stopping, by the inverter, driving the output of the load; and/or if $Td < Ts$, repeating steps a to c.

* * * * *